US010382368B2

(12) United States Patent
Niu et al.

(10) Patent No.: US 10,382,368 B2
(45) Date of Patent: *Aug. 13, 2019

(54) METHODS AND SYSTEMS FOR CREATING AUTO-REPLY MESSAGES

(71) Applicant: Tencent Technology (Shenzhen) Company Limited, Shenzhen (CN)

(72) Inventors: Xun Niu, Shenzhen (CN); Yanan Zhao, Shenzhen (CN); Jihua Huang, Shenzhen (CN); Haiyang Wang, Shenzhen (CN); Yuhao Chen, Shenzhen (CN); Yan Qi, Shenzhen (CN); Jiyan Huang, Shenzhen (CN); Zhaohong Ma, Shenzhen (CN); Guodong Zhang, Shenzhen (CN); Jing Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 38 days.

This patent is subject to a terminal disclaimer.

(21) Appl. No.: 15/688,526

(22) Filed: Aug. 28, 2017

(65) Prior Publication Data
US 2017/0359278 A1 Dec. 14, 2017

Related U.S. Application Data

(63) Continuation of application No. 14/711,601, filed on May 13, 2015, now Pat. No. 9,794,198, which is a (Continued)

(30) Foreign Application Priority Data

Jul. 19, 2013 (CN) .......................... 2013 1 0305682

(51) Int. Cl.
*H04L 12/58* (2006.01)
*G06F 17/22* (2006.01)
(Continued)

(52) U.S. Cl.
CPC ............ *H04L 51/02* (2013.01); *G06F 3/0481* (2013.01); *G06F 17/2247* (2013.01); *G06F 17/24* (2013.01); *H04L 67/18* (2013.01)

(58) Field of Classification Search
CPC ....... H04L 51/02; H04L 67/18; G06F 3/0481; G06F 17/2247; G06F 17/24
See application file for complete search history.

(56) References Cited

U.S. PATENT DOCUMENTS

| 6,029,171 A | 2/2000 | Smiga et al. |
|---|---|---|
| 6,718,368 B1 | 4/2004 | Ayyadurai |

(Continued)

FOREIGN PATENT DOCUMENTS

| CN | 1530868 A | 9/2004 |
|---|---|---|
| CN | 1719404 A | 1/2006 |

(Continued)

OTHER PUBLICATIONS

Tencent Technology, ISRWO, PCT/CN2014/082446, Oct. 24, 2014, 7 pgs.

(Continued)

*Primary Examiner* — Tadesse Hailu
(74) *Attorney, Agent, or Firm* — Morgan, Lewis & Bockius LLP

(57) ABSTRACT

This application discloses a method implemented on a client system for creating an automatic reply message. The client system obtains content information of a webpage including information concerning a plurality of content items. A graphical user interface is created using one or more of the plurality of content items. Then, the auto-reply message is (Continued)

composed in accordance with the plurality of content items and additional user instructions. The auto-reply message is further associated with one or more predefined keywords according to one or more auto-reply rules, and sent along with these predefined keywords to a server system. The server system is configured to return the auto-reply message automatically to a subscriber device of a public account of a social network application in response to a user inquiry including one or more predefined keywords.

20 Claims, 9 Drawing Sheets

Related U.S. Application Data continuation of application No. PCT/CN2014/082476, filed on Jul. 18, 2014.

(51) Int. Cl.
  *G06F 3/0481* (2013.01)
  *G06F 17/24* (2006.01)
  *H04L 29/08* (2006.01)

(56) References Cited

U.S. PATENT DOCUMENTS

| | | | |
|---|---|---|---|
| 7,177,796 B1 | 2/2007 | Damerau et al. | |
| 8,521,823 B1 | 8/2013 | Sheinberg et al. | |
| 8,668,531 B2 | 3/2014 | Yamaguchi et al. | |
| 10,044,650 B1* | 8/2018 | Gupta | H04L 51/063 |
| 2006/0047615 A1 | 3/2006 | Ravin et al. | |
| 2007/0130274 A1 | 6/2007 | Lee et al. | |
| 2007/0201634 A1 | 8/2007 | Bonnaud et al. | |
| 2007/0260694 A1 | 11/2007 | Boss et al. | |
| 2009/0077185 A1 | 3/2009 | Chiu et al. | |
| 2009/0106367 A1 | 4/2009 | Banerjee et al. | |
| 2009/0305676 A1 | 12/2009 | Zhang | |
| 2009/0313224 A1 | 12/2009 | Fields et al. | |
| 2010/0082652 A1 | 4/2010 | Jones et al. | |
| 2010/0306249 A1* | 12/2010 | Hill | G06F 17/30867 707/769 |
| 2011/0161541 A1 | 6/2011 | Madukkarumukumana et al. | |
| 2012/0083287 A1 | 4/2012 | Casto et al. | |
| 2012/0297004 A1* | 11/2012 | Wijbrans | H04L 51/38 709/206 |
| 2013/0013924 A1* | 1/2013 | Dixon | H04L 63/101 713/168 |
| 2014/0136569 A1 | 5/2014 | Miller et al. | |
| 2014/0280623 A1 | 9/2014 | Duan | |

FOREIGN PATENT DOCUMENTS

| | | |
|---|---|---|
| CN | 1932817 A | 3/2007 |
| CN | 101076184 A | 11/2007 |
| CN | 101102255 A | 1/2008 |
| CN | 101115068 A | 1/2008 |
| CN | 101127050 A | 2/2008 |
| CN | 101477571 A | 7/2009 |
| CN | 102508897 A | 6/2012 |
| CN | 103647696 A | 3/2014 |

OTHER PUBLICATIONS

Tencent Technology, IPRP, PCT/CN2014/082446, Jan. 19, 2016, 5 pgs.
Tencent Technology, ISRWO, PCT/CN2014/082476, Apr. 15, 2015, 6 pgs.
Tencent Technology, IPRP, PCT/CN2014/082476, Jan. 24, 2017, 4 pgs.

* cited by examiner

METHODS AND SYSTEMS FOR CREATING AUTO-REPLY MESSAGES

RELATED APPLICATIONS

This application is a continuation application of U.S. patent application Ser. No. 14/711,601, entitled "METHODS AND SYSTEMS FOR CREATING AUTO-REPLY MESSAGES" filed on May 13, 2015, which is a continuation application of PCT Patent Application No. PCT/CN2014/082476, entitled "METHODS AND SYSTEMS FOR CREATING AUTO-REPLY MESSAGES" filed on Jul. 18, 2014, which claims priority to Chinese Patent Application No. 201310305682.2, entitled "METHOD AND APPARATUS FOR GENERATING AUTO-REPLY MESSAGE IN INSTANT MESSAGING," filed on Jul. 19, 2013, all of which are incorporated by reference in their entirety.

This application relates to U.S. patent application Ser. No. 14/711,636, entitled "KEYWORD BASED AUTOMATIC REPLY GENERATION IN A MESSAGING APPLICATION", filed May 13, 2015, which is a continuation application of PCT Patent Application No. PCT/CN2014/082446, entitled "KEYWORD BASED AUTOMATIC REPLY GENERATION IN A MESSAGING APPLICATION" filed on Jul. 18, 2014, which claims priority to Chinese Patent Application No. 201310305762.8, entitled "METHOD AND APPARATUS FOR GENERATING A KEYWORD AUTO-REPLY CORRELATION IN INSTANT MESSAGING," filed on Jul. 19, 2013, all of which are incorporated by reference in their entirety.

TECHNICAL FIELD

The disclosed implementations relate generally to the field of internet data communication, and in particular, to methods and systems of creating an automatic reply (auto-reply) message used to respond to a user inquiry on a communication platform of an email message application, a social network application, an instant messaging application and the like.

BACKGROUND

An instant messaging (IM) application is often used to exchange and process information in real time over the Internet. In particular, an IM application allows two or more users of different terminals to communicate with each other instantly by exchanging text messages, documents, voice and video clips over an available communication network. Examples of popular IM applications include MiChat, YY voice, QQ, WeChat, Baidu Hi, Sina UC, Alitalk, Fetion, WhatsApp, Facebook Messenger, Twitter, and Skype Messenger.

In addition to the communication function, some IM applications also provide public platforms, support friend circles, and push messages to their users. For example, in WeChat, a user may add a friend by using a built-in function, WeChat Shake, by searching for a specific number, by searching for a user in the vicinity, or by scanning a two-dimension quick reference (QR) code, and thereby, set up a friend circle among his or her added friends. The user may also subscribe to a public platform managed by a webmaster, and receive information and updates from posted by the webmaster on the public platform. The user may also post information in his or her friend circle or on the public platform.

A public platform provided by an IM application allows a user (an individual or a company) who normally registers the public platform under a public account to share textual, video and audio information with a specific group of people. The specific group of people is subscribers of this public platform which is normally managed by a webmaster. These subscribers may send inquiries and requests on the public platforms, and for the sake of efficiency, some IM applications provide a keyword based automatic reply (auto-reply) function to reply to these inquires and requests automatically. For example, in WeChat, the user of the public account may specify a specific auto-reply message according to a keyword, and this specific auto-reply message may include texts, pictures, audios and/or videos associated with the keyword. Further, in a specific example, a keyword of "company profile" is correlated with a company profile website, and according to such a correlation, the auto-reply message associated with the keyword of "company profile" includes a link to the company profile website. When a subscriber sends a message containing the keyword of "company profile" to this public account, the public account will automatically reply to the subscriber a message containing the link to the company profile website.

There are two existing methods in prior art for generating an auto-reply message based on a specific keyword. The first method involves online editing using a keyword based auto-reply editor that is embedded in an IM based public platform. The auto-reply editor includes a keyword box, and a message body box in which a user manually fills the specific keyword and the content of the auto-reply message correlated with the specific keyword, respectively. During this course of creating the keyword based auto-reply message, the user has to manually edit the message body, upload certain IM message materials (e.g., pictures, audio or video files), and/or associate the auto-reply message with content items of a webpage. After the auto-reply message is composed for the specific keyword, it is stored in association with the corresponding public account by a server that manages the IM messaging application.

The second method of generating a keyword based auto-reply message involves importing a data file that is created according to a specific format. This data file includes a keyword and content of the auto-reply message correlated with the keyword, which are manually arranged in the data file according to the specific format. During the course of creating this keyword based auto-reply message, the user also has to manually edit the message body, enter links to certain IM message materials (e.g., pictures, audio or video files), and/or associate the auto-reply message with a webpage. This data file is also stored in association with the corresponding public account by a server that manages the IM messaging application, and may be extracted for generating the auto-reply message automatically in response to a subscriber's inquiry or request containing the specific keyword.

Despite their acceptable performance, the above two methods are plagued with some technical problems. Specifically, each auto-reply message of a public account has to be created in a manual manner, and corresponding manual operations are normally complicated, resulting in low operating efficiency and low accuracy rates. When an auto-reply message needs to be changed, (e.g., when the above-mentioned company profile webpage changes), the auto-reply message associated with a specific keyword has to be edited manually to reflect the change. Thus, maintenance of the correlation between the keyword and the auto-reply message is complicated, which demands an intensive labor and results in a relatively high labor cost.

SUMMARY

The above deficiencies and other problems associated with the conventional approaches of network communication are reduced or eliminated by the application disclosed below. In some embodiments, the application is implemented in a client system that has one or more processors, memory and one or more modules, programs or sets of instructions stored in the memory for performing multiple functions. Instructions for performing these functions may be included in a computer program product configured for execution by one or more processors.

One aspect of the application is a method that is implemented on a client system for creating an automatic reply (auto-reply) message. The method includes obtaining content information of a webpage, and the content information of the webpage includes a set of predetermined tags and information concerning a plurality of content items that are configured to be displayed together in the webpage. The method further includes creating a graphical user interface (GUI) for composing the auto-reply message, and generating a preview of the webpage in the GUI for composing the auto-reply message. The webpage preview includes the plurality of content items configured for user selection. The method further includes composing the auto-reply message in accordance with a user selection of a specific content item of the webpage in the webpage preview, wherein the auto-reply message at least includes corresponding information of the specific content item displayed in the webpage. The method further includes associating the auto-reply message with one or more predefined keywords according to one or more auto-reply rules, and sending the auto-reply message and the corresponding predefined keywords to a server system. The server system is configured to store the auto-reply message in an auto-reply database and return the auto-reply message automatically to a subscriber device in response to a subsequent user inquiry including at least one of the predefined keywords from the subscriber device.

Another aspect of the application is a client system that includes one or more processors and memory having at least one program (including instructions) stored thereon, which when executed by the one or more processors cause the processors to perform operations to create an auto-reply message. The at least one program stored on the memory includes instructions for causing the client system to perform the method described above.

Another aspect of the present application is a non-transitory computer readable storage medium that stores at least one program configured for execution by at least one processor of a client system. The at least one program includes instructions for causing the client system to perform the method described above.

Other embodiments and advantages may be apparent to those skilled in the art in light of the descriptions and drawings in this specification.

BRIEF DESCRIPTION OF DRAWINGS

The above features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be obvious to one skilled in the art that the subject matter may be practiced without these specific details. In other instances, well-known methods, procedures, components, modules, and circuits have not been described in detail so as not to unnecessarily obscure aspects of the embodiments.

In order to make a clear understanding of purposes, technical schemes and advantages of the present application, the present application is described in detail below with reference to the attached drawings. The described embodiments are merely examples of the present application, not the whole invention. In addition to the embodiments of the present application, all the other embodiments obtained by those skilled in the art without any creative labor belong to the protective scope of the present application.

Figure 1:
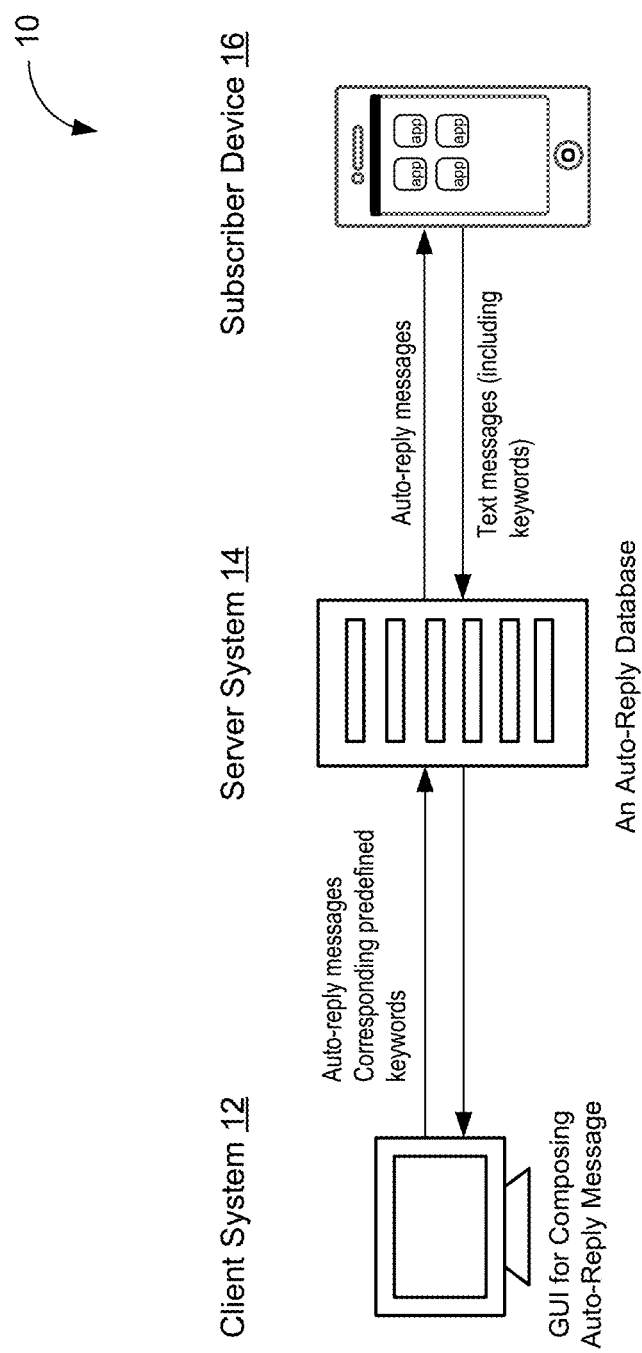
FIG. 1 illustrates an exemplary process for generating an auto-reply message and using the auto-reply message in accordance with some embodiments of the application.

FIG. 1 illustrates an exemplary process 10 for generating an auto-reply message and using the auto-reply message in accordance with some embodiments of the application. Process 10 optionally involves a client system 12, a server system 14 and one or more subscriber devices 16. In accordance with process 10, client system 12 loads a graphical user interface (GUI), and allows a webmaster to compose the auto-reply message on the GUI based on a webpage managed by the webmaster. Once the auto-reply message is created, it is transferred from client system 12 to server computer 14. Server computer 14 stores the auto-reply message in an auto-reply database. Subsequently, when server computer 14 receives a user inquiry (sometimes in a format of a text message) from a subscriber device 16, it identifies the auto-reply message according to the user inquiry, and responds to the user inquiry by sending the identified auto-reply message to the request subscriber device 16.

The auto-reply message is configured to include some or all content information of the webpage. In some embodiments, what content information of the webpage is included in the auto-reply message is determined by the webmaster. Specially, the GUI displayed on client system 12 enables the webmaster to manually link the content items of the webpage with the auto-reply message. In some embodiments, what content information of the webpage is included in the auto-reply message is determined according to one or more auto-reply rules. In a specific example, each auto-reply rule identifies one or more keywords, and associates each specific keyword with one or more content items of the webpage. Thus, the auto-reply message selectively includes some content items in the webpage according to the one or more keywords as specified in the corresponding auto-reply rules. Then, upon receiving a user inquiry (e.g., a text message) containing a specific keyword, server computer 14 identifies a corresponding auto-reply message according to the specific keyword, and sends this auto-reply message to subscriber device 16 that has made the user inquiry.

In some embodiments, subscriber device 16 is configured to enable the subsequent user inquiry and receive the auto-reply message on a communication platform selected from an email message application, a social network application, an instant messaging application and the like. For example, a user of subscriber device 16 is a subscriber to a public account in a WeChat application. Therefore, the user of subscriber device 16 relies on a WeChat interface made available on subscriber device 16 to enter the user inquiry and receive the auto-reply message returned by server system 14.

Further, in this example, the public account provides information concerning a product or service to a large number of subscribers on the WeChat platform. A convenient way to respond to inquiries made by the large number of subscribers is to create an auto-reply database that includes some auto-reply messages in anticipation of the subscribers' potential inquiries. When the WeChat platform is applied to support this public account, the subscribers' inquiries are communicated on this platform, and the auto-reply messages in the auto-reply database are also formatted according to the requirements of the WeChat application. Accordingly, client system 12 has to take into consideration the WeChat's format requirements, when it composes the auto-reply message on its GUI display.

Various embodiments of the present application are focused on creating auto-reply messages, on client system 12, which may be used by server system 14 to respond to subsequent user inquiries received from subscriber devices 16. In some implementation, the GUI display that is relied on to create the auto-reply messages on client system 12 is embedded in a communication application (e.g., WeChat). However, in some implementations, the GUI display of client system 12 is developed as an independent application, and may create auto-reply messages that are compatible with different communication platforms.

Figure 2A:
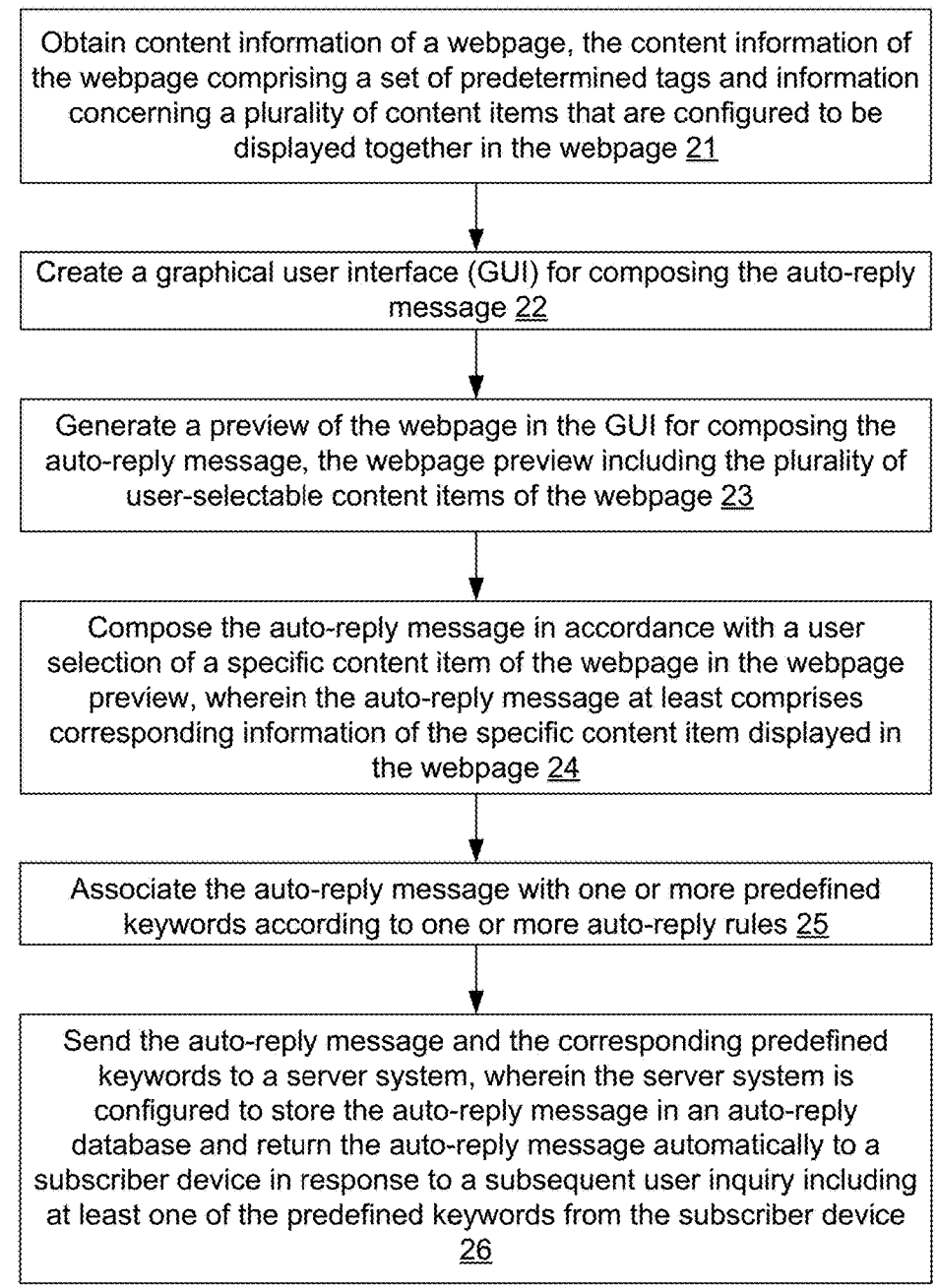
FIG. 2A illustrates a flow chart representing a method for creating an auto-reply message on a client system in accordance with some embodiments of the application.

FIG. 2A illustrates a flow chart representing a method 20A for creating an auto-reply message on client system 12 in accordance with some embodiments of the application. Method 20A is, optionally, governed by instructions that are stored in a non-transitory computer readable storage medium and that are executed by one or more processors of a client system (e.g., client system 12). Each of the operations shown in FIG. 2A may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 20A may be combined and/or the order of some operations may be changed.

Client system 12 obtains (21) content information of a webpage, and the content information of the webpage includes a set of predetermined tags and information concerning a plurality of content items that are configured to be displayed together in the webpage. In some embodiments, client system 12 uses a webpage link to access the webpage, and downloads the content information of the webpage from a web server that sponsors the webpage. Therefore, in some embodiments, the content information of the webpage includes HTML source codes of the webpage, and the HTML source codes further include HTML tags and links to the plurality of content items.

The plurality of content items include at least textual content and pictures. In some embodiments, the plurality of content items includes video clips and/or audio clips. Further, in some embodiments, the content items of the webpage include a title and a uniform resource locator (URL) address of the webpage.

Client system 12 creates (22) a graphical user interface (GUI) for composing the auto-reply message based on the content information of the webpage. Specifically, a preview of the webpage is generated (23) and loaded in the GUI for composing the auto-reply message, and the webpage preview includes the plurality of content items of the webpage that are configured for user selection.

In some implementations, client system 12 identifies content types for the content items of the webpage, and automatically populates different sections of the auto-reply message with the content items of the webpage in accordance with the corresponding content types of the content items of the webpage. In some embodiments, the content types for the content items of the webpage are identified based on a plurality of tags that are included in corresponding source codes of the webpage. In some implementations, client system 12 receives an auto-reply editing request in the GUI display to edit the auto-reply message, and automatically populates different sections of the auto-reply message with the content items of the webpage based on the auto-reply editing request.

After the webpage preview is generated in the GUI, the auto-reply message is composed (24) in accordance with a user selection of a specific content item of the webpage in the webpage preview, wherein the auto-reply message at least includes corresponding information of the specific content item displayed in the webpage. In some implementations, client system 12 receives a content request command for adding a section (also called as "an entry") to the auto-reply message based on the content items of the webpage, and fills the added section of the auto-reply message with the specific content item in accordance with the user selection of the specific content item.

Then, client system 12 associates (25) the auto-reply message with one or more predefined keywords according to one or more auto-reply rules, and sends (26) the auto-reply message and the corresponding predefined keywords to a server system 14.

The server system is configured to store the auto-reply message in an auto-reply database, and return the auto-reply message automatically to a subscriber device 16 in response to a subsequent user inquiry including at least one of the predefined keywords from the subscriber device. In some embodiments, server system 14 is configured to respond to the subsequent user inquiry including the at least one of the predefined keywords by sending the auto-reply message that includes the corresponding information of the specific content item to subscriber device 16 and causing subscriber device 16 to display the specific content item on its display according to the information of the specific content item.

In some implementations, subscriber device 16 is configured to enable the subsequent user inquiry and receive the auto-reply message on a communication platform selected from an email message application, a social network application, an instant messaging application and the like. Therefore, in some implementations, after composing the auto-reply message, client system 12 generates a preview of the auto-reply message according to a format of the communication platform.

In some embodiments, client system 12 determines an auto-reply criterion for each auto-reply message based on personal information of a corresponding user account on subscriber device 16. Server system 14 returns the auto-reply message in response to a subsequent user inquiry, only when the personal information provided by subscriber device 16 satisfies the auto-reply criterion. In one example, the personal information of the corresponding user account includes geographical location information of subscriber device 16, and the geographical location information is measured by subscriber device 16 and communicated to server system 14 in the subsequent user inquiry. In accordance with the auto-reply criterion, the auto-reply message is returned in response to a subsequent user inquiry when subscriber device 16 is determined to be located in a specific region based on the geographical location information.

Further, in some embodiments, server system 14 is configured to respond to the subsequent user inquiry from subscriber device 16 by retrieving the auto-reply message in the auto-reply database, and further composing the auto-reply message according to personal information of a corresponding user account on subscriber device 16, before it returns the auto-reply message to the subscriber device. In a specific example, the personal information of the corresponding user account includes geographical location information of subscriber device 16. The auto-reply message is automatically edited according to the geographical location information prior to being returned to subscriber device 16.

In some embodiments, the personal information of the corresponding user account includes shopping activities and/or behavior patterns of a user. Then, server computer 14 is configured to determine whether to send an auto-reply message or further edit an auto-reply message according to the shopping activities and/or behavior patterns of the user. As such, server computer 14 provides customized content information that is better targeted at this specific user.

In some embodiments, client system 12 also receives manual input from an input device of client system 12, such that the auto-reply message may be manually composed by a webmaster. Specifically, the webmaster may add, edit or delete some textual information (e.g., a letter) of the auto-reply information. Thus, in some implementations of the present application, the auto-reply message is optionally generated by automatic content populating from the webpage, the webmaster's selection of the content items displayed in the webpage, and/or the webmaster's manual editing on the GUI display of client system 12.

It should be understood that the particular order in which the operations in FIG. 2A have been described are merely exemplary and are not intended to indicate that the described order is the only order in which the operations could be performed. One of ordinary skill in the art would recognize various ways to create auto-reply messages as described herein. Additionally, it should be noted that details of other processes described herein with respect to method 20B (e.g., FIG. 2B) are also applicable in an analogous manner to method 20A described above with respect to FIG. 2A. For brevity, these details are not repeated here.

Figure 2B:
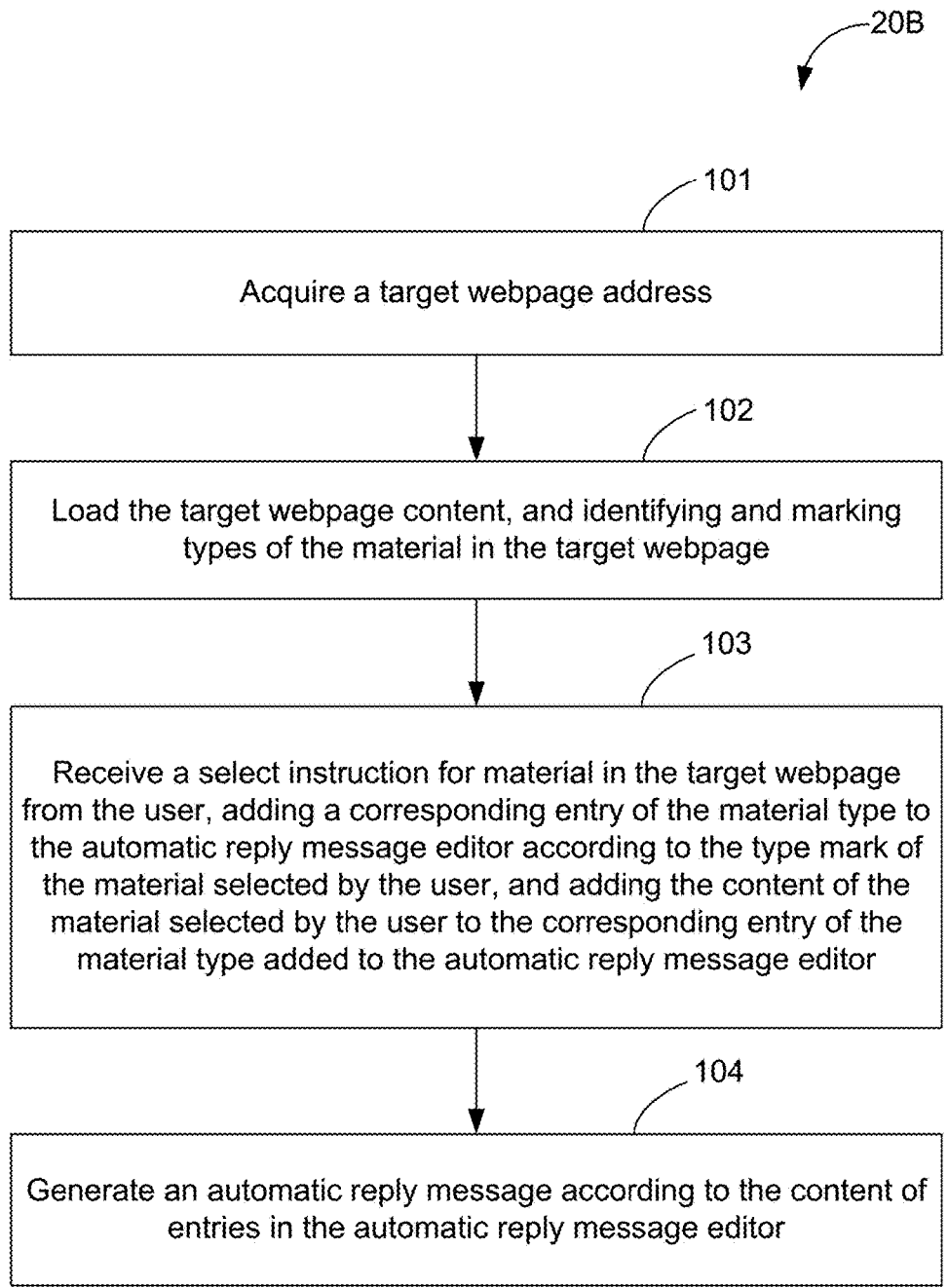
FIG. 2B illustrates a flow chart representing a method for generating auto-reply messages in an instant messaging application in accordance with some embodiments of the application.

FIG. 2B illustrates a flow chart representing a method 20B for generating auto-reply messages in an instant messaging (IM) application in accordance with some embodiments of the application. Method 20B is, optionally, governed by instructions that are stored in a non-transitory computer readable storage medium and that are executed by one or more processors of a client system (e.g., client system 12). Each of the operations shown in FIG. 2B may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 20B may be combined and/or the order of some operations may be changed.

Figure 3A:
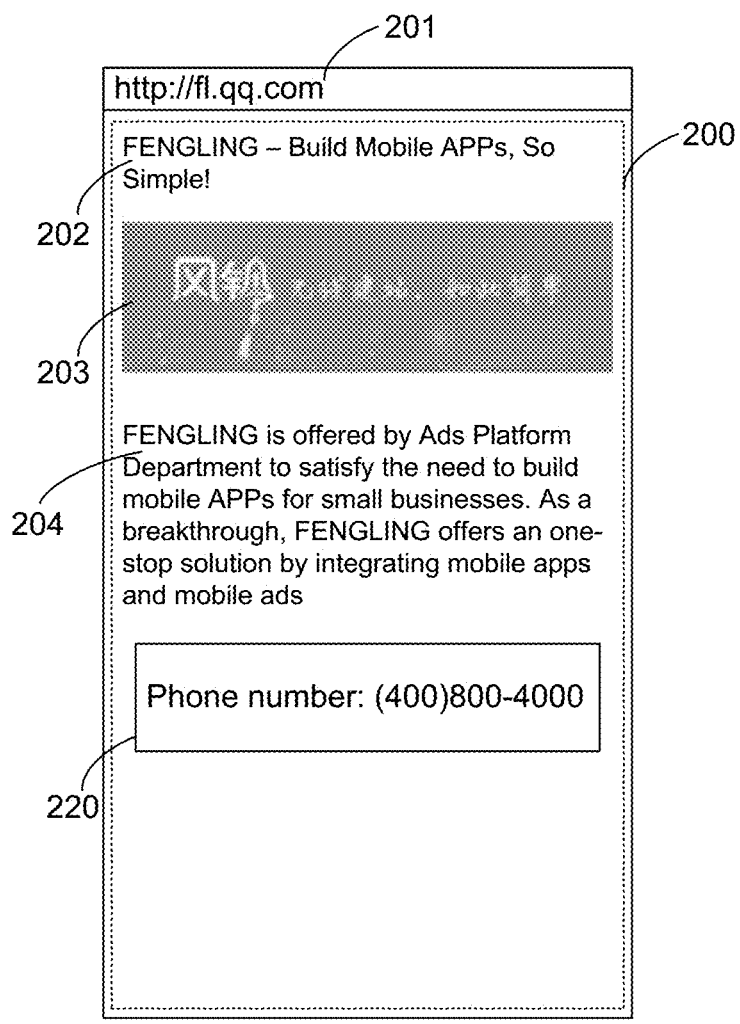
FIG. 3A illustrates an exemplary webpage preview that is displayed on a GUI of a client system in accordance with some embodiments of the application.
Figure 3B:
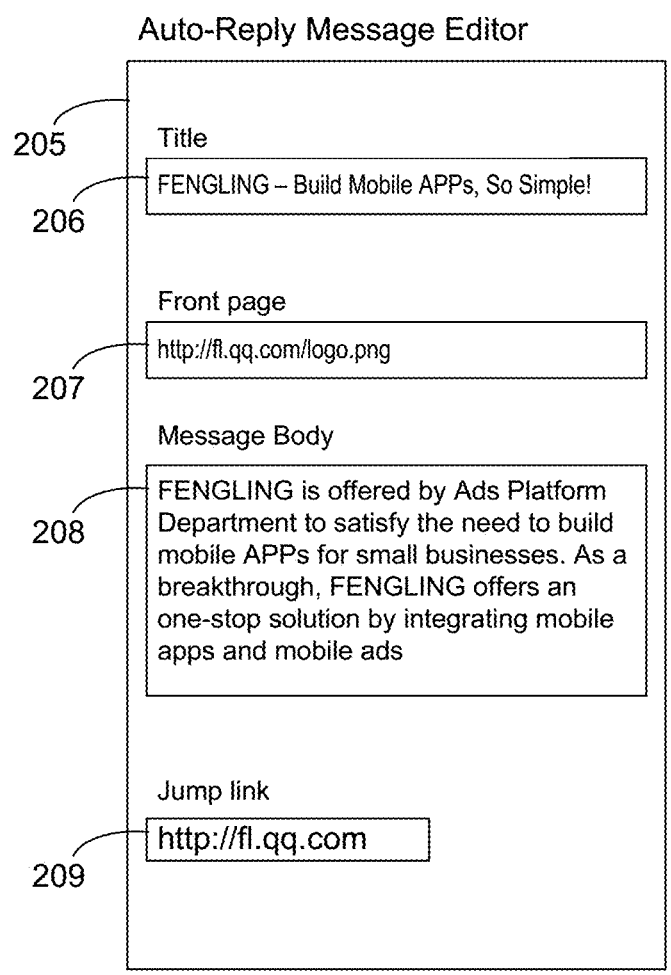
FIG. 3B illustrates an exemplary auto-reply message editor for composing an auto-reply message in accordance with some embodiments of the application.
Figure 3C:
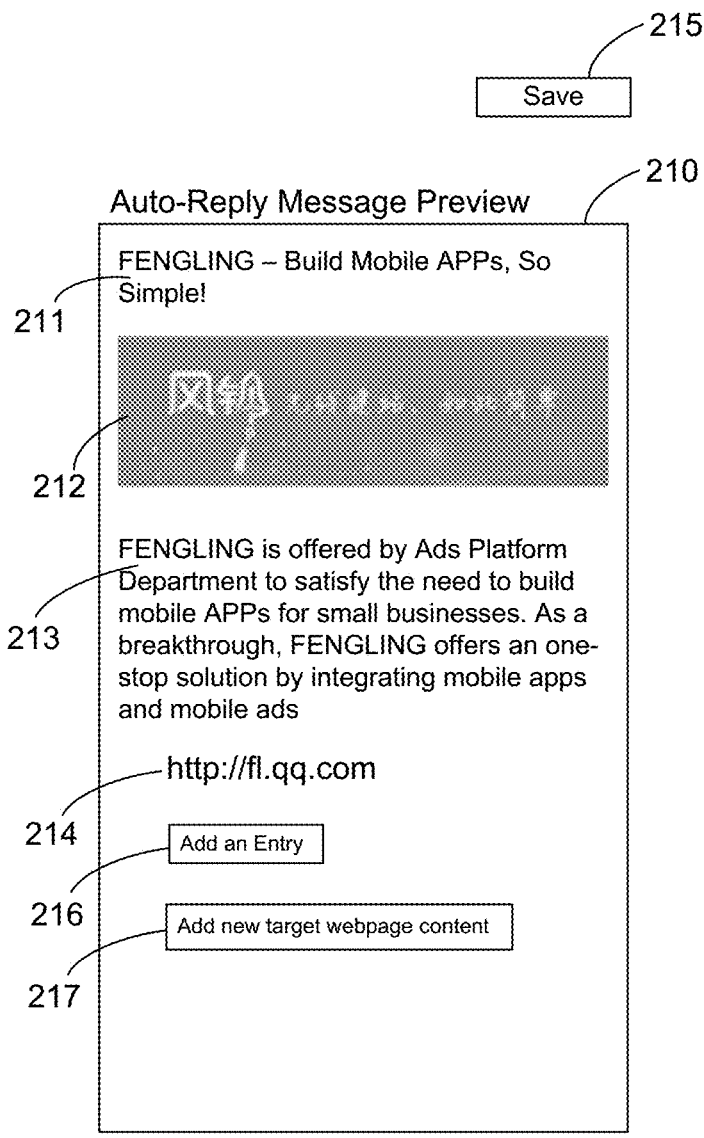
FIG. 3C illustrates an exemplary preview of an auto-reply message composed by an auto-reply message editor in accordance with some embodiments of the application.

Method 20B is associated with GUI displays (e.g., FIGS. 3A-3C) that enable a user to interact with a client system 12 and compose the auto-reply messages in the instant messaging application loaded on the GUI display. Specifically, FIG. 3A illustrates an exemplary webpage preview 30A that is displayed on a GUI of a client system 12 in accordance with some embodiments of the application. FIG. 3B illustrates an exemplary auto-reply message editor 30B for composing an auto-reply message in accordance with some embodiments of the application. FIG. 3C illustrates an exemplary preview 30C of an auto-reply message composed by an auto-reply message editor in accordance with some embodiments of the application.

With reference to FIG. 2B, at Step 101, auto-reply creation method 20B includes acquiring a target webpage address.

Here, the target webpage address may be provided by a user of a public account of the IM application, and this user is sometimes called a webmaster who manages this public account. There may be various acquiring manners. For example, according to the present application, a loading interface of the target webpage address such as the GUI 30A in FIG. 3A may be provided, and the user of the public account may input the target webpage address into an input field 201 of the interface from which the target webpage address is acquired according to the present application.

At Step 102, auto-reply creation method 20B further includes loading the target webpage content, and identifying and marking content types of the material (e.g., content items) in the target webpage. In some embodiments, the material or content items of a target webpage includes pictures, textual information, video clips, audio clips and the like.

As shown in FIG. 3A, according to some embodiments of the present application, the target webpage content is loaded into a dotted area 200. The existing web browser technology may be adopted to load the target webpage content, and detailed description is thereof omitted here. As shown in the dotted area 200 of FIG. 3A, after the target webpage content is loaded, content items of the target webpage, such as a title "FENGLING—Build Mobile Apps, So Simple!" 202, a picture 203, a text 204, a phone number 220 and the like, are displayed on the interface.

In accordance with auto-reply creation method 20B, the content types of the material are identified and marked by: analyzing the webpage content automatically, identifying corresponding material from the target webpage content according to a content type tag of a source code of the target webpage or a customized material tag made in a webpage source code, and conducting type-marking on the material identified according to the tag type. In some embodiments, the webpage title is identified through a Title tag and marked as a title type. The webpage address is obtained through a URL tag and marked as an address type. The pictures are identified according to a "<img>" tag and marked as a picture type. The text is identified through a "<article>" tag provided by corresponding HTML5 codes and marked as a text type. The phone number is identified through a "<div class='widget-call'>" tag customized in the corresponding webpage source codes and marked as a telephone call type.

At Step 103, auto-reply creation method 20B further includes receiving from the user a select instruction for material in the target webpage, adding a corresponding entry of the content type to the auto-reply message editor according to the type mark of the material selected by the user, and adding the content of the material selected by the user to the corresponding entry of the content type added to the auto-reply message editor.

In some embodiments, user selection is required. The user needs to click on material that he or she wishes to add into the auto-reply message in the dotted area 200 of the GUI as shown in FIG. 3A. The clicked material is added into the corresponding entry of the content type of the auto-reply message editor shown in FIG. 3B. Such a selection operation is relatively simple and effective for creating the auto-reply message.

In some embodiments, when the user clicks the picture 203 in FIG. 3A, the user click is captured using a JavaScript based technology in the front end, and accordingly, a select instruction is generated for selecting the clicked picture 203. After receiving the select instruction, the material is determined to be a picture according to the type mark of the material selected by the user, and an entry space 207 is created on the auto-reply message editor of FIG. 3B. A link to the selected picture is then added to the created entry space 207 on this auto-reply message editor of FIG. 3B automatically. In some embodiments, the user clicks the text 204 in FIG. 3A, and client system 14 receives a corresponding select instruction. Another entry space 208 is added to the auto-reply message editor of FIG. 3B according to the type mark (i.e., the text type) of the selected material. The clicked text is then added to the newly added entry space 208 automatically.

Further, in some embodiments, content types of the material associated with an entry or section of the auto-reply message are predetermined. In step 103, material content of a specified type (i.e., added by default) in the target webpage can be added to corresponding content type entries of the auto-reply message editor. In one example, the material content of a specified type are predetermined to be the webpage title and the webpage address. In another example, the specified type may also be set as the text type and the webpage address, etc.

As shown in FIG. 3B, the auto-reply message editor 205 may at least include content type entries of the specified types, such as a title entry 206 and a jump link entry 209. With the present application, the content of the title 202 shown in FIG. 3A is added to the title entry 206 of FIG. 3B automatically, and the target webpage address in the input field 201 shown in FIG. 3A is added to the jump link entry 209 of FIG. 3B automatically.

At Step 104, auto-reply creation method 20B further includes generating an auto-reply message according to the content of entries in the auto-reply message editor. For example, an auto-reply message including the title 206, the picture 207, the text content 208 and the jump link 209 can be generated according to the content of entries in the auto-reply message editor as shown in FIG. 3B.

In a preferred embodiment of the present application, based on the embodiment of FIG. 2B, the present application may further includes generating a preview interface of the auto-reply message according to the content of entries of the auto-reply message editor in real time, wherein the preview display of the current content of entries of the auto-reply message editor is presented in a display format of an IM client.

In a preferred embodiment, as long as the content of an entry of the auto-reply message editor increases or changes, the preview interface will change in real time accordingly and present the preview display of the current content of the entry of the auto-reply message editor in the display format of the IM client. An preview interface 210 of an auto-reply message generated according to the content of entries of the auto-reply message editor shown in FIG. 3B is shown in the preview interface of FIG. 3C, wherein the process includes generating a corresponding title 211 according to the content of the title entry 206, acquiring a corresponding picture 212 according to the address shown in the picture type entry 207 and displaying the picture, generating text 213 according to the content of the text type entry 208, and generating a jump link 214 according to the content of the jump link entry 209. If the user considers that the content of the auto-reply message is correct by viewing the preview interface 210 of the auto-reply message, then the user may click a save button 215 to save the content of the auto-reply message.

In addition, in a further embodiment based on any one of the embodiments described above, the present application may further include: receiving an edit instruction from the user to the auto-reply message editor and editing the content of an entry in the auto-reply message editor according to the editing instruction. For example, if the user clicks the text type entry 208 in the auto-reply message editor of FIG. 3B, a process for editing on the content of the text type entry may be triggered, and then the user may modify the text content. While the user edits and modifying the content of the text type entry, the content of text 213 of the preview display in the preview interface of FIG. 3C may also change in real time and synchronously.

Further, in some embodiments based on any one of the embodiments described above, according to the present application, an instruction of adding an entry of a content type may be received from the user to add a corresponding entry of the content type to the auto-reply message editor according to the instruction; and receive an instruction of editing in the entry of the content type from the user to edit the content of the entry of the content type according to the edit instruction. For example, as shown in FIG. 3C, the user may click a "adding an entry" button 216 to issue an instruction of adding an entry of a content type, and then an entry of the content type will be added to the auto-reply message editor. The specific type of the content type entry may be selected and set by the user, and the content of the entry of the content type may be edited by the user. After editing in the added entry of the content type, the preview interface 210 may take a preview display of the auto-reply message including the newly the added entry of the content type in real time.

In some embodiments, according to the present application, an instruction of adding new target webpage content may also be received from the user, and then the steps of the above embodiment including step 101 to 104 is repeated with respect to the new target webpage address. For example, when the user clicks a "adding new target webpage content" button 217 in FIG. 3C, a new loading interface which is similar to the loading interface shown in FIG. 3A appears, and the user of the public account may input a target webpage address to the input field 201 of the new loading interface. According to the present application, the target webpage address from the address input field is acquired, the new target webpage content is loaded into the loading interface to identify the material in the new target webpage, an instruction of selecting the material of the target webpage is received from the user, a corresponding entry of the content type is added to the auto-reply message editor shown in FIG. 3B and the content of the material selected by the user is added to the added corresponding entry of the content type of the auto-reply message editor. Thus, the material contents of a plurality of target web pages may be added to an auto-reply message collectively, thereby improving the richness of the content of the auto-reply message.

According to some embodiments of the present application, a keyword correlated to the auto-reply message is identified by the public account and received by server computer 14. Thus, server computer 14 stores the keyword, the auto-reply message and their correlation are stored together in an auto-reply database. Thus, when a user of subscriber device 16 sends a message to the public account, the public platform system identifies a keyword in the message automatically, retrieves from the auto-reply database the auto-reply message correlated with the keyword, and sends the auto-reply message to the user who sends the message, thereby realizing a keyword based auto-reply function for the public account in the IM application.

It should be understood that the particular order in which the operations in FIG. 2B have been described are merely exemplary and are not intended to indicate that the described order is the only order in which the operations could be performed. One of ordinary skill in the art would recognize various ways to create auto-reply messages as described herein. Additionally, it should be noted that details of other processes described herein with respect to method 20A (e.g., FIG. 2A) are also applicable in an analogous manner to method 20B described above with respect to FIG. 2B. For brevity, these details are not repeated here.

Figure 4A:
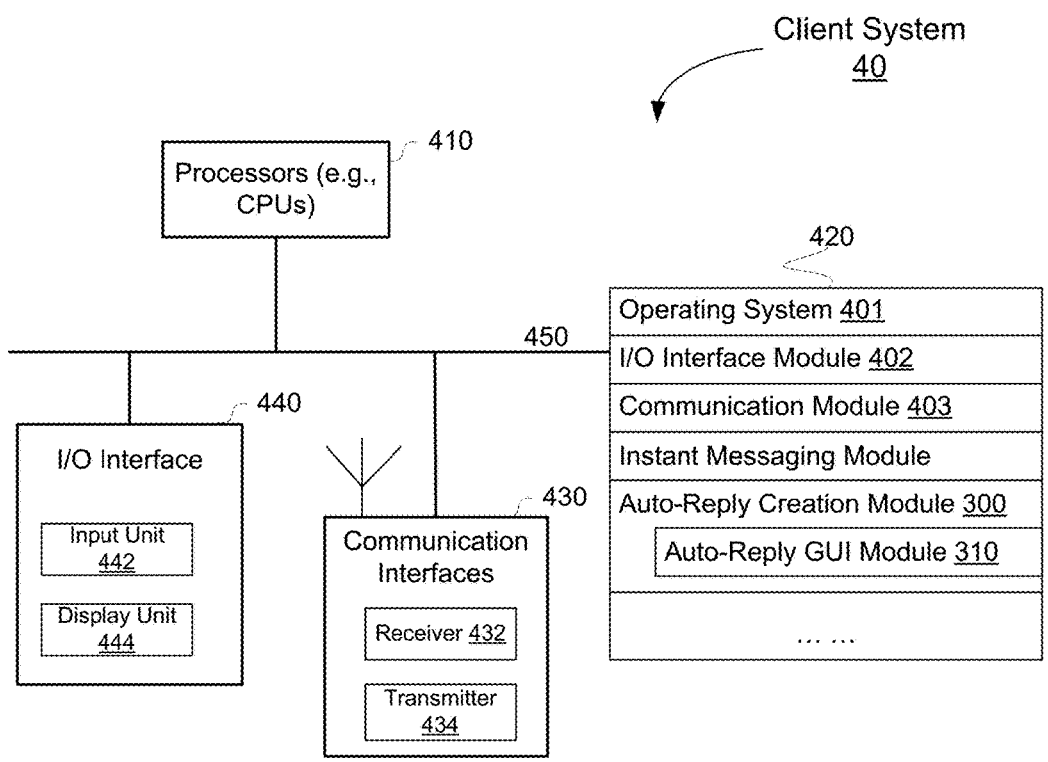
FIG. 4A illustrates a block diagram of a client system that creates an auto-reply message in accordance with some embodiments of the application.

FIG. 4A illustrates a block diagram of a client system that creates an auto-reply message in accordance with some embodiments of the application. In some implementations, client system 12 at least includes one or more processors 410 (e.g., central processing units) and a memory 420 for storing data, programs and instructions for execution by one or more processors 410. In some implementations, client system 12 further includes one or more communication interfaces 430, an input/output (I/O) interface 440, and one or more communication buses 450 that interconnect these components.

In some embodiments, I/O interface 440 includes an input unit 442 and a display unit 444. Examples of input unit 442 include a keyboard, a mouse, a touch pad, a game controller, a function key, a trackball, a joystick, a microphone, a camera and the like. Additionally, display unit 444 displays information that is inputted by the user or provided to the user for review. Examples of display unit 444 include, but are not limited to, a liquid crystal display (LCD) and an organic light-emitting diode (OLED) display. In some implementations, input unit 442 and display unit 444 are integrated on a touch-sensitive display that displays a graphical user interface (GUI).

In some embodiments, communication buses 530 include circuitry (sometimes called a chipset) that interconnects and controls communications between system components. In some embodiments, communication interfaces 430 further include a receiver 432 and a transmitter 434.

In some embodiments, memory 420 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 420 includes one or more storage devices remotely located from the one or more processors 410. In some embodiments, memory 420, or alternatively the non-volatile memory device(s) within memory 420, includes a non-transitory computer readable storage medium.

In some embodiments, memory 420 or alternatively the non-transitory computer readable storage medium of memory 420 stores the following programs, modules and data structures, instructions, or a subset thereof:

Operating System 401 that includes procedures for handling various basic system services and for performing hardware dependent tasks;

I/O interface module 402 that includes procedures for handling various basic input and output functions through one or more input and output devices, wherein I/O interface module 402 further includes an interface display module that controls displaying of a graphical user interface;

Communication module 403 that is used for connecting client system 12 to other computational devices (e.g., servers and subscriber devices), via one or more network communication interfaces 450 (wired or wireless) and one or more communication networks, such as the Internet, other wide area networks, local area networks, metropolitan area networks, and so on;

Auto-reply creation module 300 that creates auto-reply messages for use by server system 104. In some embodiments, auto-reply creation module 300 at least includes an auto-reply GUI module 310 that creates the GUI for composing auto-reply messages. In some embodiments, auto-reply creation module 300 further includes some of modules 301-306 as shown below in FIGS. 4B and 4C. More details on auto-reply creation module 300 are also explained above with reference to FIGS. 1, 2A-2B and 3A-3C.

In some embodiments, like client system 12, server system 14 and subscriber device 16 include their respective one or more processors 410, memory 420, communication interfaces 430, and I/O interface 440. Respective memory 420 includes operating system 401, I/O interface module 402, and communication module 403. Further, in some embodiments, subscriber device 16 further includes at least one communication platform module (e.g., instant messaging module 404 or a social network module). This communication platform module provides a communication platform for its users to interact with each other. In a specific example, the communication platform supports a public group which individual private users may subscribe to, and a business user may establish such a public group to provide information relevant to its products or services to its subscribers.

The auto-reply messages created by auto-reply creation module 300 of client system 12 are required to have a format compatible with the corresponding communication platform on subscriber device 16. In some embodiments, the GUI for composing the auto-reply message is embedded in a communication platform installed on client system 102. In some embodiments, the GUI for composing the auto-reply message is enabled by an application independent of the communication platform.

Figure 4B:
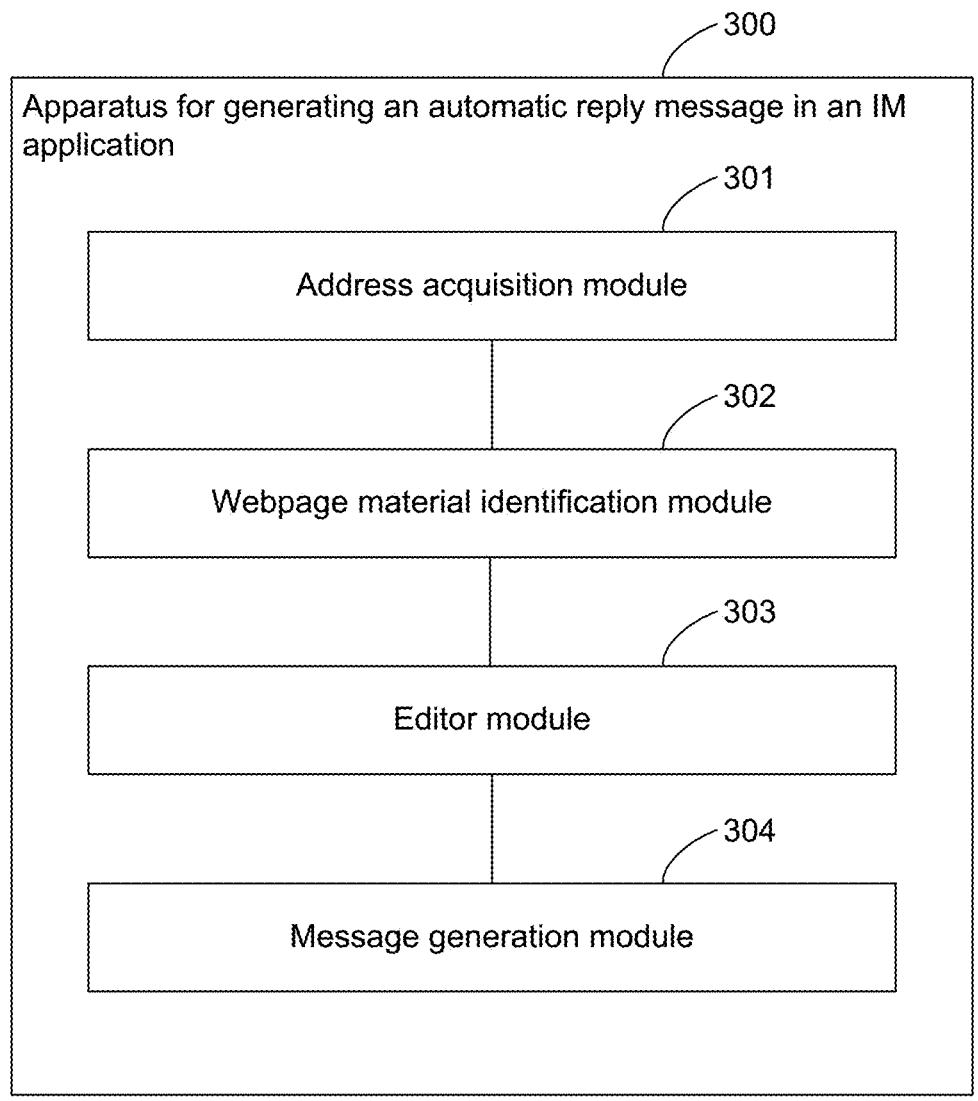
FIG. 4B illustrates a block diagram of an auto-reply creation module associated with an instant messaging application in accordance with some embodiments of the application.

FIG. 4B illustrates a block diagram of an auto-reply creation module 300 associated with an instant messaging application in accordance with some embodiments of the application. Auto-reply creation module 300 further includes the following modules:

an address acquisition module 301 for acquiring an address of a target webpage;

a webpage material identification module 302 for loading target webpage content, for example as shown in FIG. 3A, and identifying and marking types of the material of the target webpage, wherein the webpage material identification module 302 is specifically used to load the target webpage content, identify corresponding material from the target webpage content according to a content type tag of a source code of the target webpage or a customized material tag made in a webpage source code, and conduct type-marking on the material identified according to the tag type;

an editor module 303 for receiving an instruction of selecting the material in the target webpage from the user, adding corresponding entry spaces (e.g., spaces 206-209 on the GUI 30B) to an auto-reply message editor according to the type mark of the material selected by the user, and adding the content of the material selected by the user to the corresponding entry spaces, as shown in FIG. 3B; and a message generation module 304 for generating an auto-reply message according to the content of entries of the auto-reply message editor.

In some embodiments, the editor module 303 is further used to add material content of a specified type in the target webpage to corresponding content type entries of the auto-reply message editor automatically. For example, the specified type of material content may be the webpage title and the webpage address.

In some embodiments, the editor module 303 is further used to receive an editing instruction to the auto-reply message editor from the user and edit the content of an entry in the auto-reply message editor according to the editing instruction, as shown in FIG. 3B.

Figure 4C:
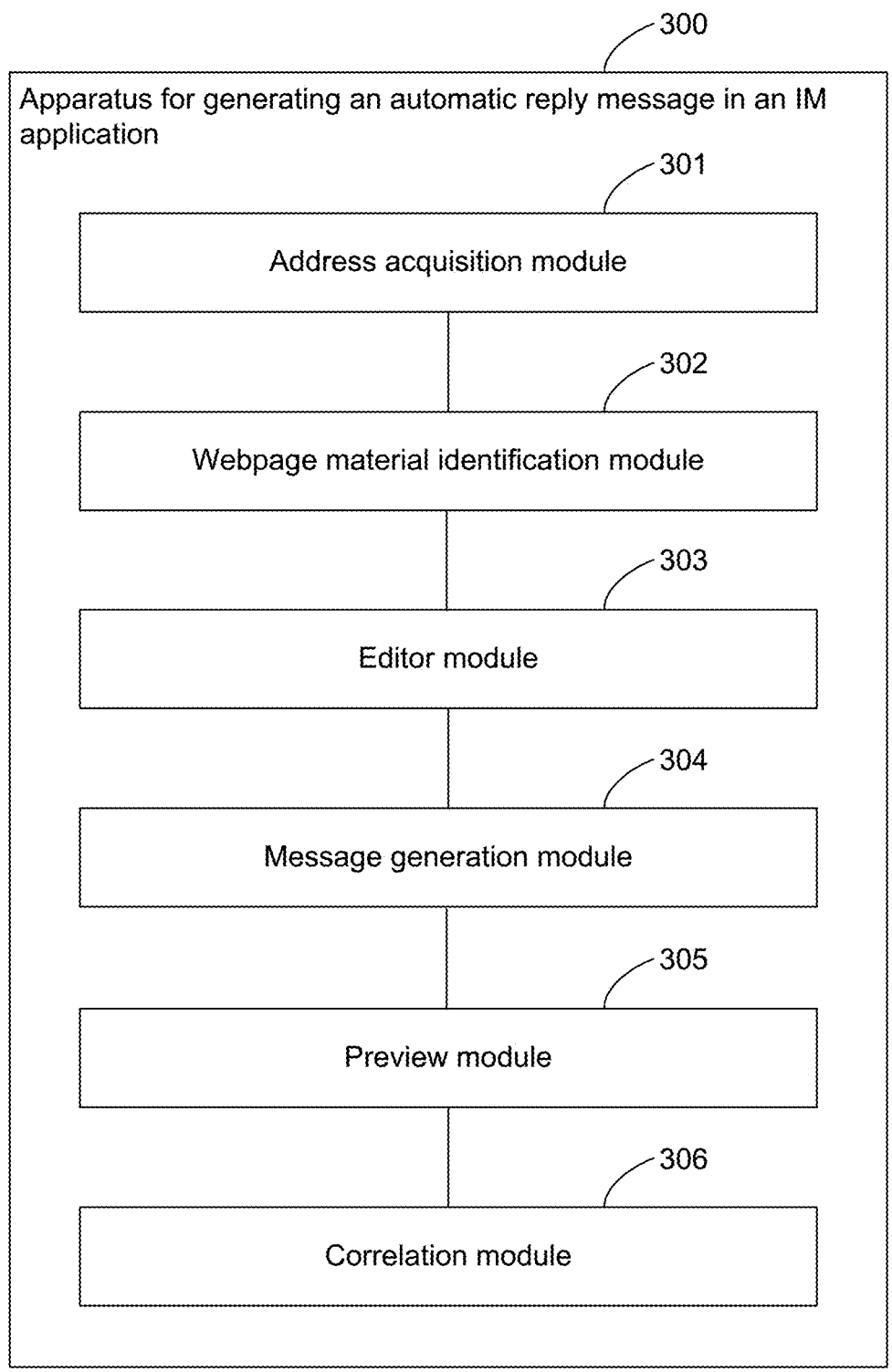
FIG. 4C illustrates a block diagram of another auto-reply creation module associated with an instant messaging application in accordance with some embodiments of the application.

FIG. 4C illustrates a block diagram of another auto-reply creation module 300 associated with an instant messaging application in accordance with some embodiments of the application. Auto-reply creation module 300 further includes a preview module 305 for generating a preview interface of the auto-reply message according to the content of entries of the auto-reply message editor in real time, as shown in FIG. 3C, wherein the preview display of the current content of entries of the auto-reply message editor is presented in the display format of the IM client.

Based on any one of the embodiments described above, the apparatus of the present application may further include an entry adding module for receiving an instruction of adding an entry of a content type from the user, such as clicking the button 216 shown in FIG. 3C, and adding a corresponding entry of the content type to the auto-reply message editor. The editor module 303 is further used to receive an instruction of editing the added entry of the content type from the user and edit the content of the entry of the content type according to the editing instruction.

Based on any one of the embodiments described above, the apparatus of the present application may further include a webpage content adding module for receiving an instruction of adding new target webpage content from the user, such as clicking the button 217 shown in FIG. 3C, triggering the editor module to receive an instruction of selecting the material of the new target webpage from the user with respect to the new target webpage address, adding a corresponding entry of the content type to the editor according to the type mark of the material selected by the user and adding the content of the material selected by the user to the corresponding entry of the content type added to the editor.

In some embodiments, auto-reply creation module 300 further includes a correlation module 306 for identifying keywords correlated with the auto-reply message and storing the keywords, the auto-reply message and the correlation between the keyword and its auto-reply message.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of creating an auto-reply message for a public account of a social network application in response to a user inquiry from a subscriber device of the public account, the method comprising:
   on a client system having one or more processors and memory storing one or more programs for execution by the one or more processors:
      obtaining content information of a webpage, the content information of the webpage comprising a set of predetermined tags and information concerning a plurality of content items that are configured to be displayed together in the webpage;
      creating a graphical user interface (GUI) using one or more of the plurality of content items, the GUI further including one or more icons for receiving additional user instructions for composing the auto-reply message;
      composing the auto-reply message in accordance with the plurality of content items and the additional user instructions, the auto-reply message including at least a uniform resource locator (URL) address of the webpage;
      associating the auto-reply message with one or more predefined keywords according to one or more auto-reply rules of the social network application; and
      sending the auto-reply message and the corresponding predefined keywords to a server system, wherein the server system is configured to associate the auto-reply message with the public account of the social network application in an auto-reply database and return the auto-reply message automatically to a subscriber device of the public account in response to a user inquiry including at least one of the predefined keywords from the subscriber device.

2. The method of claim 1, further comprising:
   determining an auto-reply criterion for the auto-reply message based on personal information of a corresponding user account of the social network application at a subscriber device; and
   sending the auto-reply criterion to the server system, wherein the server system is configured to return the auto-reply message to a subscriber device of the public account after the personal information of a user account at the subscriber device satisfies the auto-reply criterion.

3. The method of claim 2, wherein the personal information of a user account at a subscriber device includes geographical location information of the subscriber device.

4. The method of claim 1, wherein the server system is configured to establish a subscription relationship between the public account and the subscriber device before responding to the user inquiry.

5. The method of claim 1, wherein the subscriber device is configured to enable the user inquiry and receive the auto-reply message on a communication platform selected from an email message application, a social network application, an instant messaging application and the like.

6. The method of claim 5, further comprising:
   after composing the auto-reply message, generating a preview of the auto-reply message according to a format of the communication platform.

7. The method of claim 1, further comprising:
   identifying content types for the content items of the webpage; and
   automatically populating different sections of the auto-reply message with the content items of the webpage in accordance with the corresponding content types of the content items of the webpage.

8. The method of claim 1, further comprising:
   receiving an auto-reply editing request in the GUI to edit the auto-reply message; and
   automatically populating different sections of the auto-reply message with the content items of the webpage based on the auto-reply editing request.

9. The method of claim 1, wherein the content information of the webpage comprises HTML tags and one or more links to the plurality of content items, and the plurality of content items at least include textual content and pictures.

10. A client system, comprising:
   one or more processors; and
   memory having instructions stored thereon, which when executed by the one or more processors cause the processors to perform a plurality of operations including:
      obtaining content information of a webpage, the content information of the webpage comprising a set of predetermined tags and information concerning a plurality of content items that are configured to be displayed together in the webpage;

creating a graphical user interface (GUI) using one or more of the plurality of content items, the GUI further including one or more icons for receiving additional user instructions for composing the auto-reply message;

composing the auto-reply message in accordance with the plurality of content items and the additional user instructions, the auto-reply message including at least a uniform resource locator (URL) address of the webpage;

associating the auto-reply message with one or more predefined keywords according to one or more auto-reply rules of a social network application; and sending the auto-reply message and the corresponding predefined keywords to a server system, wherein the server system is configured to associate the auto-reply message with a public account of the social network application in an auto-reply database and return the auto-reply message automatically to a subscriber device of the public account in response to a user inquiry including at least one of the predefined keywords from the subscriber device.

11. The client system of claim 10, wherein the plurality of operations further comprise:

determining an auto-reply criterion for the auto-reply message based on personal information of a corresponding user account of the social network application at a subscriber device; and sending the auto-reply criterion to the server system, wherein the server system is configured to return the auto-reply message to a subscriber device of the public account after the personal information of a user account at the subscriber device satisfies the auto-reply criterion.

12. The client system of claim 10, wherein the server system is configured to establish a subscription relationship between the public account and the subscriber device before responding to the user inquiry.

13. The client system of claim 10, wherein the subscriber device is configured to enable the user inquiry and receive the auto-reply message on a communication platform selected from an email message application, a social network application, an instant messaging application and the like.

14. The client system of claim 10, wherein the plurality of operations further comprise:

identifying content types for the content items of the webpage; and automatically populating different sections of the auto-reply message with the content items of the webpage in accordance with the corresponding content types of the content items of the webpage.

15. The client system of claim 10, wherein the plurality of operations further comprise:

receiving an auto-reply editing request in the GUI to edit the auto-reply message; and automatically populating different sections of the auto-reply message with the content items of the webpage based on the auto-reply editing request.

16. The client system of claim 10, wherein the content information of the webpage comprises HTML tags and one or more links to the plurality of content items, and the plurality of content items at least include textual content and pictures.

17. A non-transitory computer-readable medium having a plurality of instructions stored thereon, which, when executed by one or more processors of a client system, cause the one or more processors to perform a plurality of operations including:

obtaining content information of a webpage, the content information of the webpage comprising a set of predetermined tags and information concerning a plurality of content items that are configured to be displayed together in the webpage;

creating a graphical user interface (GUI) using one or more of the plurality of content items, the GUI further including one or more icons for receiving additional user instructions for composing the auto-reply message;

composing the auto-reply message in accordance with the plurality of content items and the additional user instructions, the auto-reply message including at least a uniform resource locator (URL) address of the webpage;

associating the auto-reply message with one or more predefined keywords according to one or more auto-reply rules of a social network application; and sending the auto-reply message and the corresponding predefined keywords to a server system, wherein the server system is configured to associate the auto-reply message with a public account of the social network application in an auto-reply database and return the auto-reply message automatically to a subscriber device of the public account in response to a user inquiry including at least one of the predefined keywords from the subscriber device.

18. The non-transitory computer-readable medium of claim 17, wherein the plurality of operations further comprise:

determining an auto-reply criterion for the auto-reply message based on personal information of a corresponding user account of the social network application at a subscriber device; and sending the auto-reply criterion to the server system, wherein the server system is configured to return the auto-reply message to a subscriber device of the public account after the personal information of a user account at the subscriber device satisfies the auto-reply criterion.

19. The non-transitory computer-readable medium of claim 17, wherein the plurality of operations further comprise:

identifying content types for the content items of the webpage; and automatically populating different sections of the auto-reply message with the content items of the webpage in accordance with the corresponding content types of the content items of the webpage.

20. The non-transitory computer-readable medium of claim 17, wherein the plurality of operations further comprise:

receiving an auto-reply editing request in the GUI to edit the auto-reply message; and automatically populating different sections of the auto-reply message with the content items of the webpage based on the auto-reply editing request.

* * * * *